April 15, 1941.   C. M. KENDRICK   2,238,061
FLUID PRESSURE SYSTEM AND CONTROL THEREFOR
Filed May 12, 1938   4 Sheets-Sheet 1
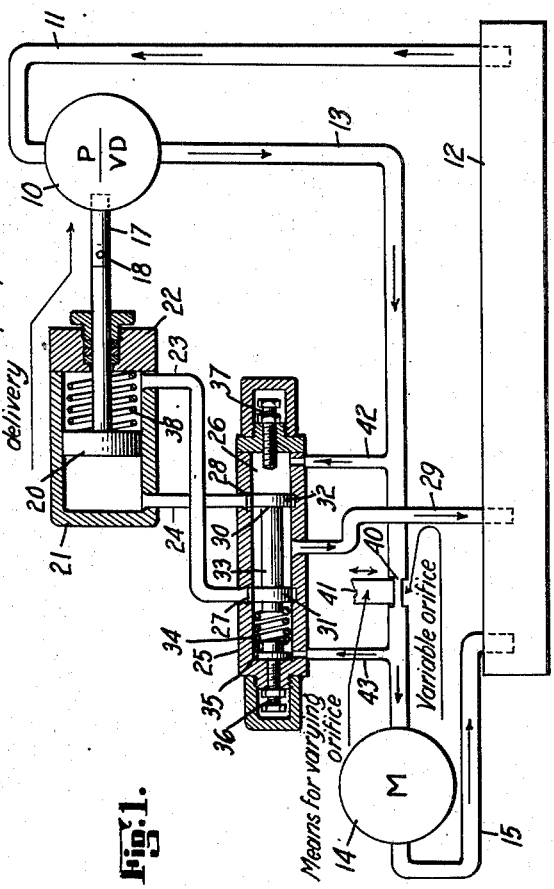
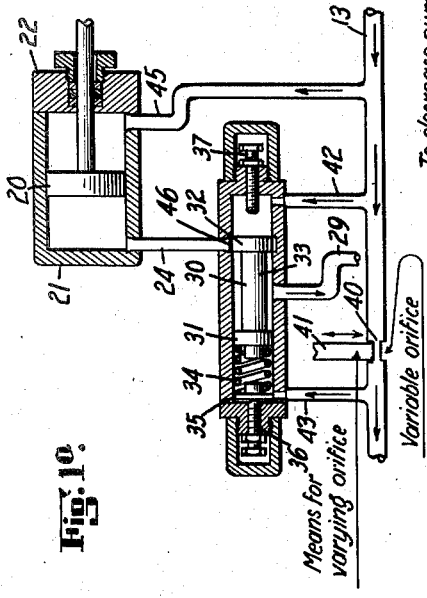
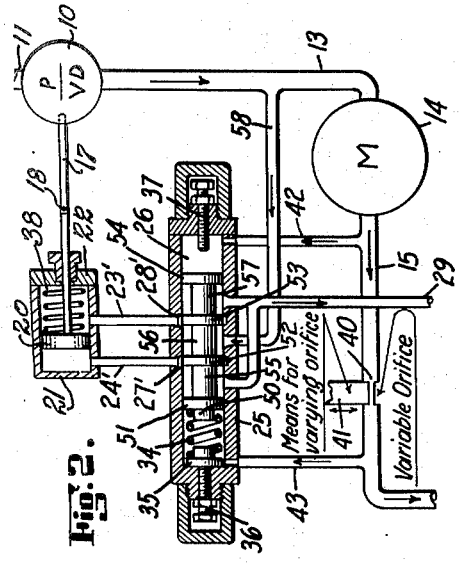
INVENTOR.
Charles M. Kendrick
BY
ATTORNEYS.

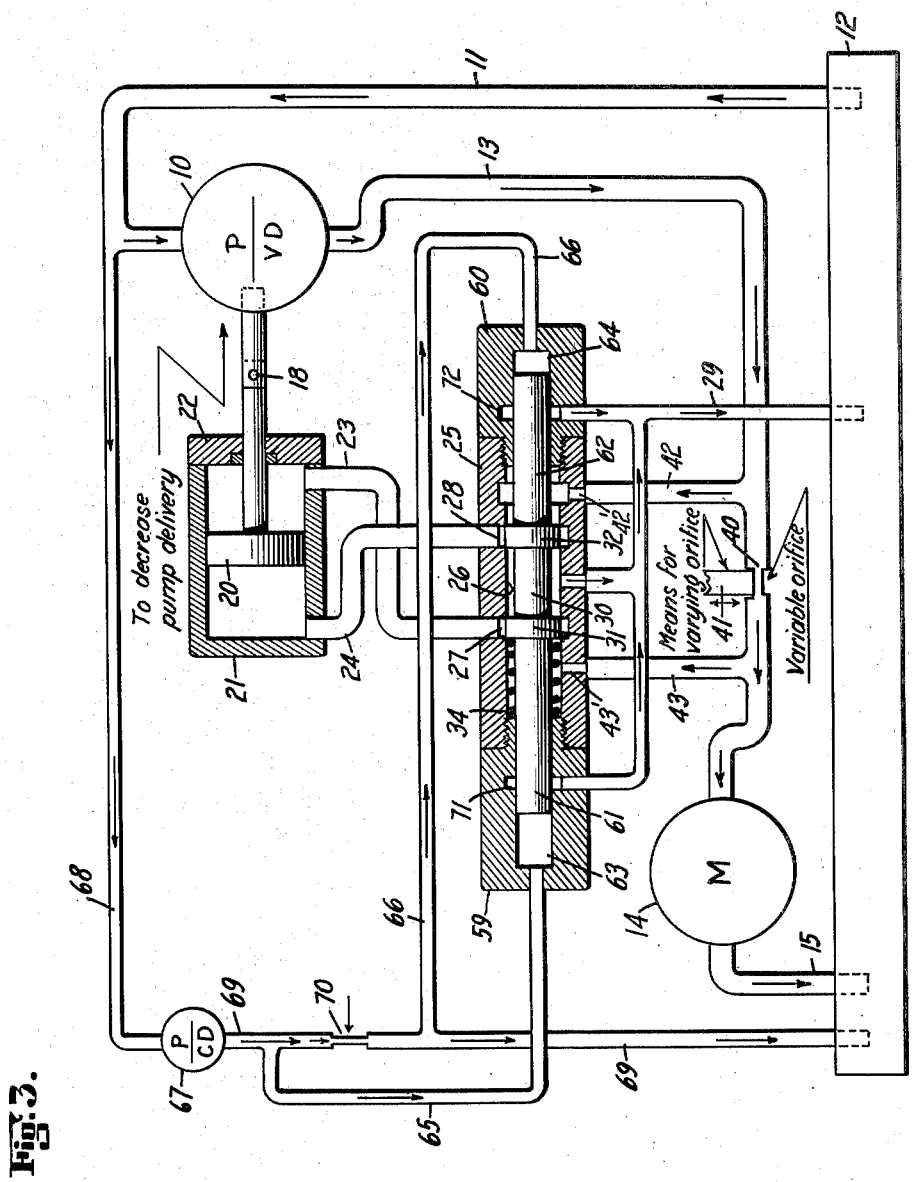

April 15, 1941. C. M. KENDRICK 2,238,061
FLUID PRESSURE SYSTEM AND CONTROL THEREFOR
Filed May 12, 1938 4 Sheets-Sheet 3

INVENTOR.
Charles M. Kendrick
BY
ATTORNEYS.

April 15, 1941.　　　　C. M. KENDRICK　　　　2,238,061
FLUID PRESSURE SYSTEM AND CONTROL THEREFOR
Filed May 12, 1938　　　　4 Sheets-Sheet 4
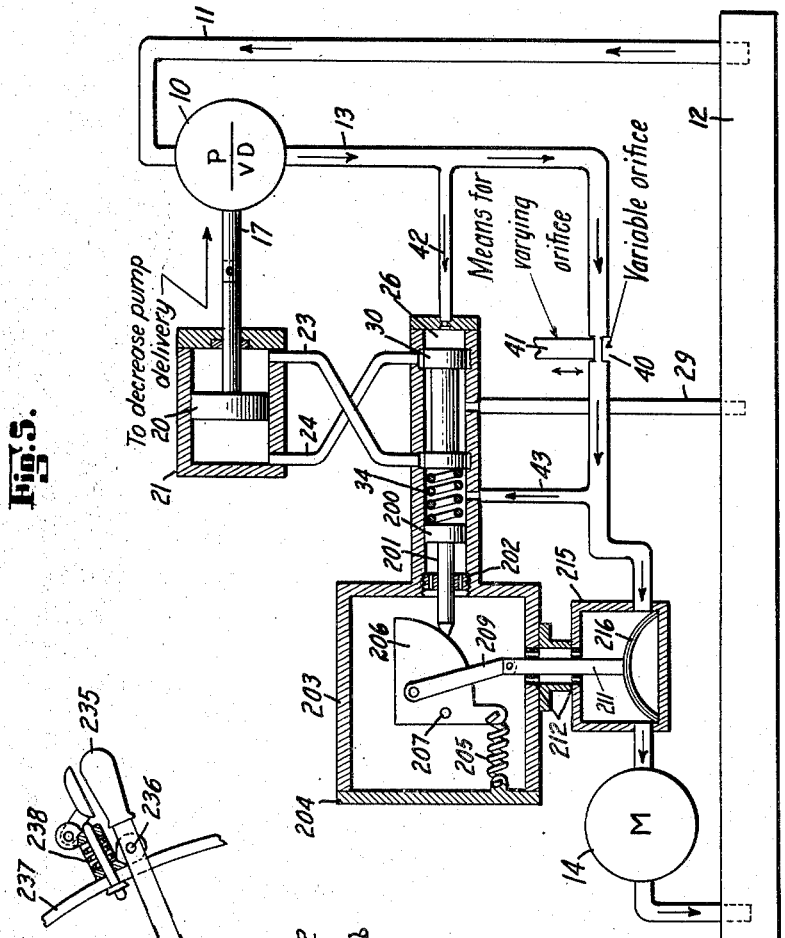
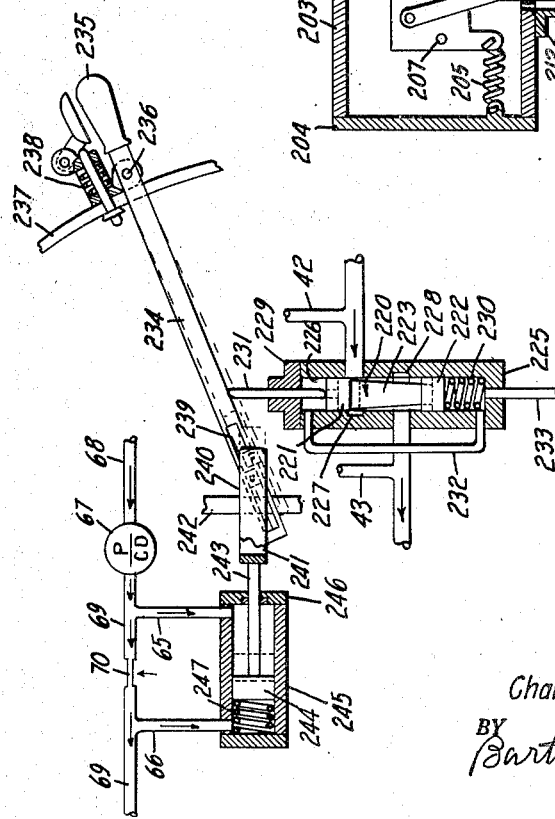
INVENTOR.
Charles M. Kendrick
BY
ATTORNEYS.

Patented Apr. 15, 1941

2,238,061

UNITED STATES PATENT OFFICE 2,238,061

FLUID PRESSURE SYSTEM AND CONTROL THEREFOR

Charles M. Kendrick, New York, N. Y., assignor to Manly Corporation, Washington, D. C., a corporation of Delaware Application May 12, 1938, Serial No. 207,512

18 Claims. (Cl. 103—37)

This invention relates to hydrostatic fluid pressure systems wherein fluid pressure operated devices are supplied with fluid under pressure by variable delivery pumps and relates more particularly to means for controlling the outputs of pumps, although certain features thereof have other applications.

One object of the invention is a novel and improved system of this character and control therefor, whereby more certain, accurate and efficient control and operation of the variable delivery pump or pumps and the fluid pressure operated devices are obtained.

A further object of the invention is a system of this character wherein an accurate, dependable and efficient control of the output of the variable delivery pump is obtained, irrespective of variations in the speed of the driven element of the variable delivery pump, and leakage therein, etc.

A further object of the invention is a system of this character whereby infinite control of the output of the variable delivery pump and the operation of the fluid pressure operated devices may be effected and the output of the pump may be maintained substantially constant for any particular adjustment.

A further object is a control of this character whereby the output of the pump will be held substantially constant at the output or rate of fluid flow determined by the control system irrespective of changes in operating pressure, temperature, speed of operation and other operating conditions which are subject to change during the course of operation and which affect the variable delivery pump's output.

A still further object is to provide an output control for variable delivery pumps in which a metering orifice is employed together with means for compensating for the effect of change in viscosity of the circulated fluid upon the difference in presures on the inlet and outlet sides of said orifice, whereby such viscosity change does not affect the fluid volume actually delivered.

Other and more specific objects will appear from the description which follows.

One application of the invention is to hydraulic transmissions and the invention will be described in connection with such use.

The invention will be understood from a consideration of the accompanying drawings which illustrate, by way of example, several embodiments of the invention.

In the accompanying drawings:

Fig. 1 is a diagrammatic view, partly in section, of an illustrative embodiment of the present invention;

Fig. 1a is a diagrammatic view, partly in section, of a modified form of the embodiment of Fig. 1;

Fig. 2 is a diagrammatic view, partly in section, showing another modification; and Figs. 3 to 6 are diagrammatic views, also partly in section, of other modifications of the invention embodying different embodiments of viscosity compensating means.

Figure 4:
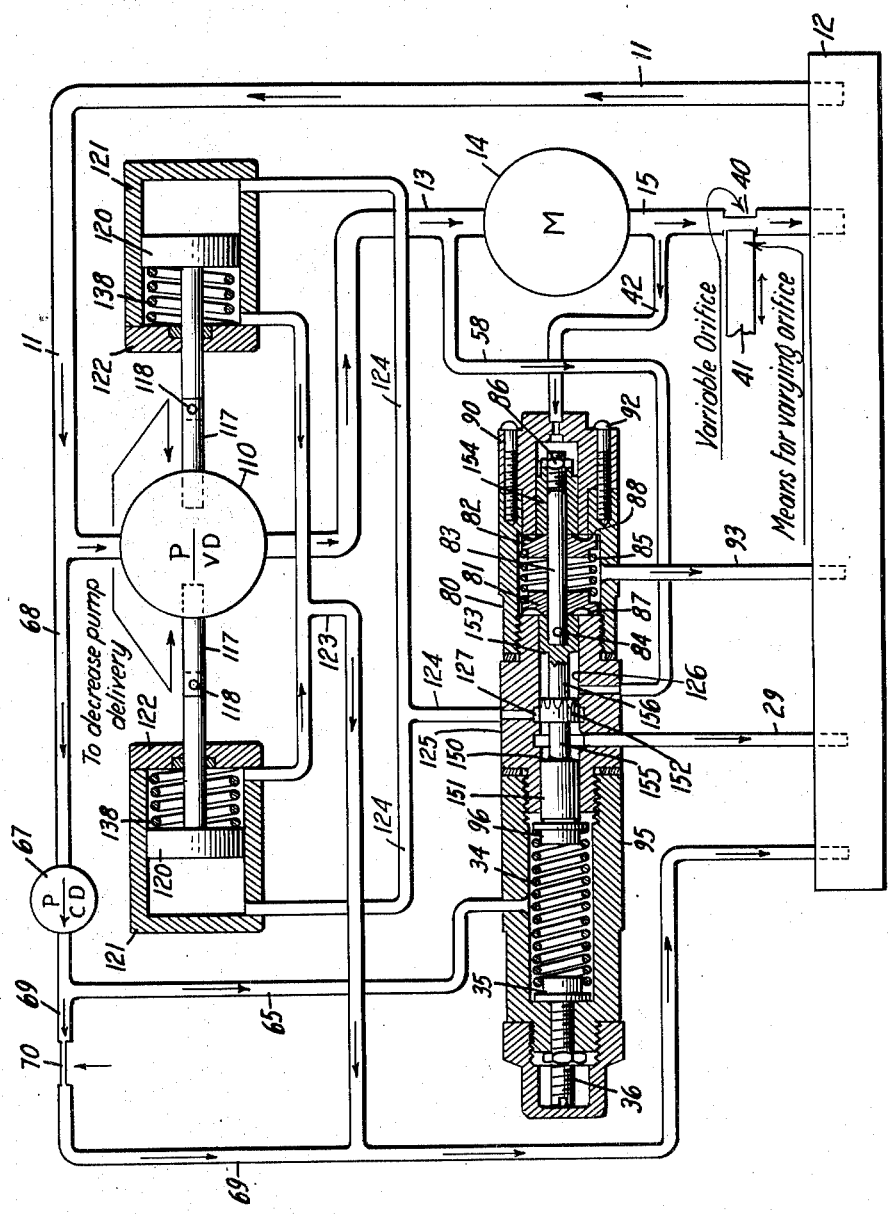

The invention is illustrated as applied to an hydraulic transmission system including a fluid actuated motor or driven device 14 and in which a liquid, such as oil, is employed for operating the driven device. The fluid pressure system is a hydrostatic fluid pressure system in which all control or regulating mechanism is responsive to the hydrostatic pressure or pressures in said system, as distinguished from systems that include jets or other mechanisms employing the kinetic energy of the moving fluid in their operation. The fluid circuit includes a variable delivery pump 10 which supplies the motive fluid for operating the driven device 14, and the operation of the latter may be controlled by manipulating a flow resistance means included in the fluid circuit, here shown as a variable orifice 40. The drawings show several modifications of the invention and in these modifications the delivery of the pump 10 and hence the operation of the motor 14 may be varied to any desired extent from minimum to maximum, this variation being effected either by varying the extent of opening of the orifice 40 or by varying the amount of pressure drop to be maintained across said orifice, or by both methods. These modifications embody control mechanisms which respond to these manipulations to adjust the delivery of the pump 10 to the exact requirements determined thereby and to maintain the output of the pump 10 at the value predetermined by any particular setting or adjustment.

Referring now these drawings, the hydrostatic fluid pressure system illustrated in Fig. 1 includes a variable delivery pump 10 receiving its supply of fluid through an inlet conduit 11 from a reservoir 12. The pump 10 is also connected with a discharge conduit having a portion 13 through which fluid under operating pressure is conveyed to the fluid actuated motor or driven member 14 and also having a portion 15 through which the fluid exhausted by the driven member 14 returns to the reservoir 12.

The volume of fluid delivered per revolution or other unit of movement of the driving element of the pump 10 is controlled in the embodiment shown by the position of a laterally movable adjusting rod or volume-determining element 17. The arrangement is such that movement of the adjusting rod 17 inward, or toward the right as viewed in Fig. 1, causes decrease in the delivered volume, while its movement outward, or toward the left, causes increase in said delivered volume.

The adjusting element 17 is moved and its position controlled by power actuated means in co-operation with control mechanism. The power actuated means in this instance is a fluid motor which includes an adjusting piston 20 reciprocable in an adjusting cylinder 21 and appropriately connected with the adjusting rod 17, as indicated at 18, for simultaneous movement therewith.

Movement of the adjusting piston 20, and hence its position, is controlled by admission of pressure fluid to one end of the adjusting cylinder 21 and simultaneous exhaust of fluid from the other end thereof under control of valve mechanism. For this purpose the ends of the adjusting cylinder 21 are suitably connected, as by passages 23 and 24 respectively, with a pair of annular cylinder ports 27 and 28 in the bore 26 of the valve housing 25, the valve bore 26 being appropriately closed at both of its ends. Admission and exhaust of fluid to and from the ends of the adjusting cylinder 21 are regulated by a valve piston 30 slidable within the valve bore 26 and provided with a pair of heads 31 and 32 which are separated by a reduced portion 33. The arrangement is such that the heads 31 and 32 cover the cylinder ports 27 and 28 respectively when the valve piston 30 is in its neutral position in which it is shown in Fig. 1 and in which said heads 31 and 32 cut off all fluid communication between the ends of the adjusting cylinder 21 and the valve bore 26, so that the adjusting piston 20 is rendered inoperative. Movement of the valve piston 30 away from its neutral position and toward the right as viewed in Fig. 1 will cause the adjusting piston 20 to move outward or toward the left; and, similarly, movement of the valve piston 30 away from its neutral position and toward the left will cause the adjusting piston 20 to move inward or toward the right, as will be later explained in more detail.

Movement and position of the valve piston 30 are controlled responsive to the actual output of the pump 10 with respect to a predetermined output thereof. In the preferred embodiment of this invention a conventional metering orifice 40 is positioned in the portion 13 of the discharge conduit, that is, in the portion of the discharge conduit intermediate the pump 10 and the driven member 14. The orifice 40 is of the variable type and may be infinitely adjusted to any size or extent of opening from its minimum (such as its zero or fully closed position) to its maximum or fully open position by any suitable means, as for instance schematically illustrated at 41, and actuated in any appropriate manner such, for example, as manually.

The opposite ends of the valve piston 30, which are of equal area, are adapted to be acted upon by fluid from the inlet and outlet sides respectively of the orifice 40 in order that said valve piston's movement may be responsive to variation in and its position corresponding to the actual rate of fluid flow through said orifice 40 with respect to the predetermined rate; that is to say, position and movement of the valve piston are determined by the actual pressure drop across the orifice 40 with respect to a predetermined pressure drop thereacross. For this purpose the opposite ends of the valve bore 26 are supplied with fluid from the inlet and outlet sides respectively of the orifice 40, as by the passages 42 and 43 which enter said valve bore 26 at points intermediate its closed ends and the ends of the valve piston 30. With this arrangement, pressure fluid from the inlet side of the orifice 40 entering the right hand end of the valve bore 26 exerts a force upon the valve piston 30 tending to move it toward the left as viewed in Fig. 1, this force being opposed by the action of pressure fluid from the outlet side of the orifice 40 upon the left hand end of the valve piston 30 which, of course, tends to move said valve piston toward the right.

The force exerted upon the valve piston 30 by pressure fluid from the outlet side of the orifice 40, that is, the force tending to move the valve piston 30 toward the right, is supplemented by force exerted by a compression spring 34 positioned in the left hand end of the valve bore 26. One end of the spring 34 bears against the adjacent end of the valve piston 30 and its other end bears against an abutment piece 35 disposed intermediate the end of said spring 34 and the end of a screw 36 which extends through the closed end of the valve bore 26 and provides means by which the compression of the spring 34 may be adjusted. The force exerted by the spring 34 thus combines with the fluid-exerted force tending to move the valve piston 30 toward the right and together they act to oppose and balance the single force exerted upon said valve piston 30 by fluid from the inlet side of the orifice 40, as will be more fully explained presently.

Movement of the valve piston 30 in the valve bore 26 is preferably limited in order to assure that both ends of the valve piston 30 are continuously exposed to the pressure fluid. The spring 34 limits the movement of the valve piston 30 toward the left and the closed right hand end of the valve bore 26 is provided with a screw 37 by which movement of the valve piston 30 toward the right may be adjustably limited.

With the parts in the position shown in Fig. 1 and the pump 10 continuously driven, pressure fluid delivered by said pump into the discharge conduit passes therethrough to the driven member 14 which is actuated thereby. The parts will remain in the position as shown whenever the output of the pump 10 is such that it produces a pressure drop across the orifice 40 of such an amount that the force exerted upon the valve piston 30 by fluid from the inlet side of the orifice 40 equals the combined opposing forces exerted by the spring 34 and the pressure fluid from the outlet side of said orifice 40. With the viscosity of the fluid constant or neglected for purposes of this explanation, it will be understood that the pressure drop across the orifice 40 (for any setting or adjustment of the size of said orifice 40 and of the compression of the spring 34) will depend entirely upon the rate of fluid flow therethrough, and hence will depend entirely upon the output of the pump 10. It will also be understood that the valve piston 30 will accordingly remain in its neutral position of Fig. 1 as long as the output of the pump 10 remains constant at an amount producing the pressure drop across the orifice 40 required to balance the force exerted by the spring 34.

For example, assuming that the spring 34 exerts a force equal to 20 lbs. per sq. in. of area of the end of the valve piston 30 exposed to the pressure fluid, it will be seen that the valve piston 30 will, for any particular setting of 41, remain in its neutral position as shown in Fig. 1 as long as the output of the pump 10 is constant and such that the pressure of the fluid on the inlet side of the orifice 40 exceeds the pressure of the fluid on the outlet side thereof by 20 lbs. per sq. in.

Increase in the output of the pump 10, as because of increase in its speed or for any other reason, will of course produce an increase in the pressure drop across the orifice 40 so that, to continue with the figures in the above example, the pressure on the inlet side of the orifice 40 will exceed the pressure of the fluid on its outlet side by an amount greater than 20 lbs. per sq. in. This increase in relative pressures wil be immediately communicated to the ends of the valve bore 26 and the force exerted upon the valve piston 30 by the fluid from the inlet side of the orifice 40 will then be greater than the combined opposing forces exerted by the spring 34 and the pressure fluid from the outlet side of said orifice 40. The valve piston 30 will thus be immediately displaced from its neutral position and moved toward the left as viewed in Fig. 1. This movement of the valve piston 30 connects the cylinder port 28 with the right hand end of the valve bore 26, permitting pressure fluid to pass from said right hand end of said valve bore 26 to the outer end of the adjusting cylinder 21; the cylinder port 27 is simultaneously connected with the portion of the valve bore 26 surrounding the valve piston's reduced portion 33, permitting exhaust of fluid from the inner end of the adjusting cylinder 21 into this portion of the valve bore and thence through the passage 29 to the reservoir 12. Pressure fluid acting upon the outer end thereof will immediately move the adjusting piston 20 in an inward or delivery-decreasing direction, thus reducing the output of the pump 10.

The pressure drop across the orifice 40 will, of course, decrease conformably with and immediately upon decrease in the output of the pump 10. Responsive to this decrease in pressure drop, the valve piston 30 will be correspondingly and simultaneously moved toward the right as viewed in Fig. 1. Decrease in the output of the pump 10, accompanied by corresponding movement of the valve piston 30 toward the right, will continue until the delivered volume is reduced to the exact amount producing the pressure drop across the orifice 40 as established by the spring 34, when the valve piston 30 will be restored to its neutral position and will again render the adjusting piston 20 inoperative. In other words, to again continue with the figures of the foregoing example, the adjusting piston 20 will move the adjusting rod 17 to decrease the output of the pump 10 until said output is reduced to the exact amount producing a pressure drop of 20 lbs. per sq. in. across the orifice 40, when the valve piston 30 will be restored to its neutral position and will again cut off communication between the cylinder ports 27 and 28 and the valve bore 26.

The operation of the mechanism is, of course, the reverse of that above explained when the output of the pump 10 is for any reason decreased below the amount at which the corresponding pressure drop across the orifice 40 produces balance of the forces acting upon the valve piston 30 in its neutral position. That is to say, when the pressure drop across the orifice 40 falls below 20 lbs. per. sq. in. to further continue the figures of the foregoing example, the valve piston 30 will be displaced from its neutral position and moved toward the right as viewed in Fig. 1. This movement of the valve piston 30 will admit pressure fluid from the left hand end of the valve bore 26 to the inner end of the adjusting cylinder 21 and will permit exhaust of fluid from the outer end thereof, the adjusting piston 20 and adjusting rod 17 being thus moved in an outward or delivery-increasing direction. This movement of the adjusting piston 20 and adjusting rod 17 will continue until the output of the pump 10 has been restored to the amount producing the pressure drop across the orifice as determined by the spring 34, that is, until the pressure drop across the orifice 40 is again restored to 20 lbs. per sq. in. in the case of the above example, when the valve piston 30 will again be restored to its neutral position.

These corrective changes in the pump's output and restoring movements of the valve piston 30 take place almost instantaneously, and the adjustments are such as to set the corrective mechanisms into operation upon slight changes in the output to be maintained.

It will thus be seen that the spring 34 determines the amount of the pressure drop to be maintained across the orifice 40, the valve piston 30 being moved in one direction or the other to effect correstive change in the pump's output whenever the pressure drop across this orifice is either greater or less than that corresponding to the force exerted upon the valve piston 30 in its neutral position by the spring 34. Position and movement of the valve piston 30 are determined and effected entirely by relative pressures existing on the inlet and outlet sides respectively of the orifice 40 and are independent of absolute pressures; that is to say, the valve piston's movement and position result from the difference between these pressures regardless of their actual amounts.

From the foregoing it will be understood that there is only one rate of fluid flow through the orifice 40 (viscosity of the fluid being neglected or considered as constant) that will produce a predetermined pressure drop across said orifice 40 for any size or extent of opening thereof, and hence there is only one output of the pump 10 meeting this requirement. It will therefore be seen that the control mechanism of the present invention functions to provide a predetermined output of the pump 10 for each particular setting or adjustment of the spring 34 and of the orifice 40, instantaneously altering the output of said pump to correct for any variation from this predetermined output. The output of the pump 10 is thus held substantially constant regardless of variations in operating conditions as long as the setting or adjustment of the spring 34 and the orifice 40 remain unchanged. Moreover, this holds true for any adjustment of the orifice 40 and there is an instant response to any such adjustment to change the pump delivery accordingly which changed delivery is then maintained constant until a further variation in orifice is made.

The corrective or compensating adjustment of output, whereby said output is instantly adjusted to correspond to the setting of 41 and is held substantially constant at that value, represents a distinct advance in fluid delivery controls for variable delivery pumps in systems of this character. Such pumps as usually employed are subject to operating conditions which change from time to time during operation and which affect the fluid volume actually delivered. The speed of the driving element of the pump is one of these variable factors. Pumps of this general class are in most instances driven by electric motors, the speeds of which change noticeably with the load, so that the speed of a pump driven thereby may, and usually will, vary during its operation. In such installations the difference between maximum speed under light load and the minimum speed under heavy load is frequently as much as 5% of the maximum speed. This variation in speed will reflect a corresponding variation in output when conventional capacity regulating means are employed, whereas the output control of the present invention acts to immediately correct for such speed variations.

Leakage or slip of fluid in the pump is another factor affecting the actual fluid volume delivered as it is physically impossible to construct a pump in which no such internal leakage occurs at high operating pressures such as are usually employed with this type of device. The amount of leakage will in turn vary with several factors such, for example, as the pressure and the temperature of the circulated fluid, and these are subject to change during the course of the pump's operation. The output control of the present invention will, of course, act to correct for any and all variations in output of this character.

Thus, the control mechanism of the present invention holds the output substantially constant, within the limits of the pump's capacity, for any particular setting or adjustment of the size or extent of opening of the orifice 40 and of compression of the spring 34, and acts to immediately correct or compensate for variations in output due to any cause whatsoever.

Another advantage of the output control of the present invention is that the same control mechanism may be used without change therein in connection with pumps of varying sizes or types. It does not require a separate or special control mechanism made for or adjusted to the peculiarities of each and every size or type of pump, as is required, for example, in conventional controls which operate only to regulate the fluid volume delivered per unit of movement of the pump's driving element without respect to any of the other factors encountered in actual operation. This is due to the fact that the control mechanism of the present invention functions responsive to actual output and hence its action is independent of the structure, type, size, etc. of the pump with which it is employed.

The output of the pump 10 is preferably regulated by varying the size of the orifice 40, as change in the size of said orifice will, of course, change the volume of fluid required to pass therethrough in order to produce the pressure drop as established by the spring 34. An infinitely variable orifice, such as here provided, thus makes it possible to infinitely vary the pump's output to any desired extent from maximum to a minimum, such as zero.

In this connection, still another advantage of the present invention should be noted, that is to say, absolutely no fluid may pass to the driven member when the control mechanism is put in its zero output position by completely closing the orifice 40. Much difficulty has been experienced in the past in obtaining absolute zero output from variable delivery pumps, particularly when their delivery is adjusted by power means. The result of this is that there has frequently been a tendency toward "creeping" movement of the driven member, even when conventional control mechanisms are adjusted to their theoretical or supposed zero output positions. This tendency toward creeping movement of the driven member is completely overcome by the output control of the present invention as it will be clear that no fluid may pass to the driven member whenever the variable orifice 40 is completely closed.

While it is usually preferable to adjust the output of the pump 10 by varying the size of the orifice 40, it is also possible to adjust its output by changing the amount of the pressure drop to be maintained across the orifice 40, as by altering the compression of the spring 34 by adjustment of the screw 36. Modification of the amount of the pressure drop to be maintained will correspondingly modify the fluid volume required to produce it (that is, the modified pressure drop) in passing through an orifice of constant size, and the control mechanism of the present invention will act to alter the pump's output accordingly. This arrangement may be preferred in certain installations such, for example, as those in which the desired variation in output is small, or in which the valve housing 25 is located more accessibly than the orifice 40, or in which it is more convenient to modify the compression of the spring than to vary the size of the orifice. This method of adjustment will usually be somewhat less efficient, however, than that in which a constant or unchanged pressure drop is employed and the output varied by change in the size of the orifice, particularly when the output is to be varied over a relatively wide range. It will be understood, however, that both methods of adjustment may be employed together as well as being capable of separate use.

No fluid will be available for moving the adjusting piston 20 to start delivery of fluid by the pump 10 when its output is reduced to zero. The inner or piston rod end of the adjusting cylinder 21 is accordingly provided with a spring 38, one end of which acts against the adjacent end of the adjusting piston 20 and the other end of which acts against the cover 22 which closes the end of the adjusting cylinder 21. The arrangement is such that the spring 38 is compressed as the adjusting piston 20 moves into its position corresponding to the zero output position of the adjusting rod 17. The energy thus stored up is available for displacing the adjusting piston 20 and adjusting rod 17 from the zero output position so that the pump may be caused to start delivery of pressure fluid when the variable orifice 40 is opened.

The embodiment illustrated in Fig. 1a differs from that of Fig. 1 principally in the arrangement for actuating the adjusting piston 20 and for controlling its movement. In this instance the inner or piston rod end of the adjusting cylinder 21 is continuously connected with the portion 13 of the discharge conduit, as by the passage 45, and movement and position of the adjusting piston 20 are controlled by admission of pressure fluid to or exhaust of fluid from the outer end of said adjusting cylinder. The valve mechanism is accordingly modified to provide a single annular cylinder port 46 which is adapted to be covered by the head 32 of the valve piston 30 when said valve piston is in its neutral position in which it is shown in Fig. 1a. The ends of the valve bore are connected with the inlet and outlet sides of the orifice 40 by the passages 42 and 43 respectively in the same manner as shown in Fig. 1, and the left hand end of the valve bore 26 is similarly provided with a spring 34 which exerts a force upon the valve piston 30 tending to move it toward the right.

Movement and operation of the valve piston 30 of Fig. 1a are effected responsive to variation in the amount of actual pressure drop across the orifice 40 with respect to a predetermined pressure drop there-across, in the same manner as explained in connection with the embodiment of Fig. 1. When the valve piston 30 of Fig. 1a is displaced from its neutral position and moved toward the left thereof, pressure fluid will be admitted to the outer end of the adjusting cylinder 21 which will act on the end of the adjusting piston 20 exposed thereto, causing said adjusting piston 20 to move inward or toward the right due to the differential or reduced area of the other side of said adjusting piston 20 produced by the piston rod. Similarly, movement of the valve piston 30 of Fig. 1a to the right of its neutral position permits exhaust of pressure fluid from the outer end of the adjusting cylinder 21, so that the adjusting piston 20 is moved outward or toward the left by the action of the pressure fluid on the other or piston rod side thereof. The thrust in both directions of the adjusting piston 20 may be made equal by making the piston rod of such side that its cross sectional area is one-half that of the adjusting piston 20, i. e., when pressure is admitted from the source through both conduits 45 and 24 the effective area of the piston tending to move the same to the right is equal to the area of the rod and when the conduit 24 is connected with the exhaust and the conduit 45 to the source of pressure, the effective area of the piston tending to move the same to the left is equal to the piston area minus the rod area and if the rod area is half the area of the piston, then the thrust in opposite directions for the same unit pressure will be equal.

The embodiments illustrated in Figs. 1 and 1a are particularly suitable for use with a metering orifice which is positioned in the fluid circuit at a point intermediate the pump and the driven member. This is the case because these embodiments pre-suppose that the pressures of the fluid admitted to the ends of the valve bore are sufficient to actuate the adjusting piston. The invention may be modified, however, for use with a variable orifice which is positioned at any point in the discharge conduit, as for example, the embodiment shown in Fig. 2 which illustrates the output control of the present invention as employed in connection with a variable orifice located in the portion of the fluid circuit intermediate the driven member and the reservoir.

The valve piston 50 (Fig. 2) is provided with four heads 51, 52, 53 and 54 respectively, separated by reduced portions 55, 56, and 57. The ends of the valve bore 26 are supplied with fluid from the portion 15 of the discharge conduit on the inlet and outlet sides respectively of the variable orifice 40, as by the passages 42 and 43, and the left hand end of the valve bore 26 is provided with a spring 34 which exerts a force upon the valve piston 50 tending to move it toward the right as viewed in Fig. 2, in the same manner as explained in connections with the embodiment of Fig. 1.

The pressure of the fluid on both the inlet and outlet sides of the orifice 40 are insufficient to actuate the adjusting piston 20 and means are accordingly provided for supplying pressure fluid for this purpose from another source. According to the arrangement of Fig. 2, pressure fluid for actuation of the adjusting piston 20 is supplied through a suitably connected passage 58 to the portion of the valve bore 26 surrounding the valve piston's reduced portion 56. This pressure fluid may be taken from any suitable source, such as an auxiliary pump, or, as here shown, from the portion 13 of the discharge conduit, that is, the portion of the discharge conduit intermediate the pump 10 and the driven member 14. The portions of the valve bore 26 surrounding the valve piston's reduced portions 55 and 57 are appropriately connected with the exhaust passage 29 leading to the reservoir 12.

It will be seen from the foregoing that movement of the valve piston 50 responsive to variation in pressure drop across the orifice 40, with respect to the predetermined pressure drop there-across as determined by the spring 34, takes place in the same manner as explained in connection with the embodiment of Fig. 1. Inasmuch as the pressure fluid for actuating the adjusting piston 20 is supplied intermediate the heads 52 and 53 of the valve piston 50, it will also be seen that the fluid connections between the cylinder ports 27' and 28' and the ends of the adjusting cylinder 21 must be the reverse of those shown in Fig. 1; that is to say, the port 27' connects with the passage 24' leading to and connecting with the outer end of the adjusting cylinder 21, whereas the port 28' connects with the passage 23' connecting with the inner end thereof. The operation of the mechanism is otherwise the same as that explained in connection with the embodiment of Fig. 1 and functions to cause a substantially constant output of the pump 10 for any particular setting or adjustment of the size of the orifice 40 and of the compression of the spring 34.

The embodiment illustrated in Fig. 2 will work equally well, and in the same manner, if the variable orifice 40 is positioned in the portion 13 of the discharge conduit and the passages 42 and 43 are correspondingly connected with said portion 13 on the inlet and outlet sides of said orifice 40. The point in the discharge conduit at which the orifice 40 is located affects only the absolute or actual pressures of the fluid admitted to the ends of the valve bore 26 and does not affect the relative pressures thereof, that is, the pressure drop across the orifice 40. As already explained, functioning of the valve piston depends entirely upon the amount of the pressure drop or difference in pressures existing on the inlet and outlet sides of the orifice 40 and is otherwise independent of the actual amounts of said pressures. The arrangement of Fig. 2 may also be modified, as already stated, by connecting the passage 58 with a separate auxiliary pump or other source of pressure fluid instead of taking this fluid from the portion 13 of the discharge conduit as shown. This may prove advantageous in installations in which the pressure of the fluid in the discharge conduit 13 is insufficient for actuating the adjusting piston 20.

The embodiments of the present invention which have been described up to this point will, as explained, act to correct or compensate for any variation in the output of the pump 10 with respect to the output determined by the setting or adjustment of the spring 34 and orifice 40 and will thus hold the delivered volume substantially constant provided the viscosity of the circulated fluid is likewise constant. There are some instances in which change in viscosity of the fluid may be neglected and in which arrangements of the general character of the embodiments described will meet all practical requirements. For example, in some installations there may be relatively little change in operating temperatures, and hence in viscosity of the fluid, as in instances where the temperature of the circulated fluid is regulated by suitable heat exchangers or the like. There are also other types of installations in which the temperature of the fluid will rise, upon starting the operation of the device which the fluid actuates, but will soon reach a point at which it will be substantially stabilized and at which it will remain throughout the continued operation of the device. In the latter case it is sometimes practical to provide adjustment or setting of the orifice 40 and spring 34 adapted to give the desired output at the stabilized temperature, since the relatively smaller output at the lower temperatures encountered initially may be acceptably used during the period prior to temperature stabilization.

The output of the pump 10 for any particular setting or adjustment of the spring 34 and orifice 40 will, however, be altered upon change in viscosity of the circulated fluid unless means are provided to compensate for such viscosity change. Resistance to flow through the orifice will decrease as the viscosity of the fluid decreases and, similarly, will increase upon increase in the fluid's viscosity, producing corresponding changes in the pressure drop across the orifice if the fluid passes therethrough at a constant rate of flow. Movement of the valve piston occurs responsive to variation in actual amount of pressure drop across the orifice with respect to a predetermined amount thereof, and this is the case irrespective of the cause of said variation. Change in amount of the pressure drop due to viscosity change would, therefore, result in movement of the valve piston to alter the output of the pump 10, and this would take place without any change in the adjustment of either the spring 34 or the orifice 40. In other words, without viscosity compensating means, decrease in viscosity of the fluid will produce a decrease in the pressure drop across the orifice 40 resulting from a constant output of the pump 10 and the valve piston will automatically move to cause the output of the pump 10 to be increased to the output at which the pressure drop is again restored to the amount determined by the spring 34. It will thus be seen, therefore, that the output of the pump 10, for any particular adjustment of the spring 34 and the orifice 40, will vary in accordance with variation in the viscosity of the fluid unless means are provided to compensate for such viscosity variation.

This variation in output of the pump 10 due to uncompensated viscosity change may cover a wide range, the exact amount of which will depend upon the range of temperatures encountered during operation and the viscosity characteristics of the particular fluid employed. Oil is the fluid usually used in systems of this general character and, as is well known, is subject to relatively large variation in viscosity in the range of operating temperatures usually encountered in practice. For example, one lubricating oil particularly well suited for use as the circulated fluid in these systems, and at present regarded as notable because its viscosity varies much less than that of the average oil, is said to have a viscosity of approximately 220 S. S. U. (Saybolt Seconds Universal) at 80° F., a viscosity of 150 S. S. U. at 100° F., and a viscosity of approximately 66 S. S. U. at 160° F. These figures indicate the wide variation in viscosity frequently encountered in practice and, unless compensated for, the output of the pump 10 will likewise vary correspondingly as already explained. Means are accordingly provided to compensate for change in viscosity of the circulated fluid in order that the output of the pump 10 will be unaffected thereby, one embodiment of which is illustrated in Fig. 3 and will now be described.

The hydrostatic fluid pressure system and arrangement illustrated in Fig. 3 is generally similar to the embodiment of Fig. 1 except for the provision of the viscosity compensating mechanism. The valve mechanism includes a valve piston 30 slidable within the valve bore 26 and provided with a pair of heads 31 and 32 which are adapted to cover the annular cylinder ports 27 and 28 respectively when said valve piston is in its neutral position in which it is shown in Fig. 3. The valve piston 30 also includes a pair of extension rods 61 and 62, of equal diameter, which extend from the heads 31 and 32 respectively and project through suitable openings in the closures of the ends of the valve bore 26 in such manner that they form substantially fluidtight sliding fits therewith. The ends of the adjusting cylinder 21 are connected with the cylinder ports 27 and 28 respectively by the passages 23 and 24 and the portions of the valve bore 26 surrounding the valve rods 61 and 62 respectively are connected with the inlet and outlet sides respectively of the orifice 40 by the passages 42 and 43 which are shown as constricted (42' and 43') at the valve bore 26 in order to reduce any tendency toward "hunting" or "chatter." The spring 34 in the left hand end of the valve bore 26 surrounds the valve rod 61 and exerts a force upon the valve piston 30 tending to move it toward the right, as in the embodiment of Fig. 1. It will thus be seen that this portion of the valve mechanism is substantially identical with that of the embodiment of Fig. 1 from which it differs, as described up to this point, only with respect to the provision of the valve rods 61 and 62. This portion of the valve mechanism is therefore capable of operation in the same manner as that described in connection with Fig. 1 and may, if desired, be so employed without regard to the viscosity compensating mechanism which will now be described.

The viscosity compensating mechanism includes a pair of cylinders or bores 63 and 64 respectively, for convenience termed "compensating cylinders," which in the present instance are formed in the members 59 and 60 which close the ends of the valve bore 26. The compensating cylinders are provided with slidably fitted pistons, termed "compensating pistons," operatively connected with the valve piston 30 and the ends of the rods 61 and 62 are utilized as the compensating pistons in the present embodiment. Each compensating piston is of such size that its cross-sectional area equals the cross-sectional area of the portions of the valve piston 30 which are exposed to the pressure fluid in the ends of the valve bore 26; this relation is here obtained by making the rods 61 and 62 of such size that the cross-sectional area of each of them is one-half the area of a section through the heads 31 or 32 of the valve piston 30.

The viscosity compensating mechanism also includes an auxiliary fluid circuit, which may be termed the "compensating circuit," which in turn includes a small, constant capacity pump 67 adapted to be continuously driven at a constant speed. The pump 67 receives its supply of oil or other fluid from the reservoir 12 and in the present instance is shown as provided with an inlet conduit 68 which connects with the inlet conduit 11 of the main pump 10. It will thus be seen that the fluid supplied to the pump 67 will at all times be of exactly the same viscosity as the fluid supplied to the main pump 10, and hence of the same viscosity as that of the fluid passing through the orifice 40. The pump 67 is also provided with a discharge conduit 69 leading to the reservoir 12 and having an orifice 70 which is shown as a variable orifice although a fixed orifice may be employed since the size thereof is not adjusted during operation.

With this arrangement, the amount of the pressure drop across the orifice 70 will be constant as long as the viscosity of the circulated fluid is constant but will vary immediately upon and conformably with any change taking place in the viscosity of said fluid. As the fluid passing through the orifice 70 is of substantially the same viscosity as the fluid passing through the orifice 40, it will be seen that change in viscosity of the circulated fluid will produce identical changes in the amounts of the pressure drops across both of these orifices for constant rates of fluid flow through them. The rate of fluid flow through the orifice 70 is constant for the reason that the pump 67 is of constant capacity and is driven at a constant speed. Hence the change in pressure drop across the orifice 70 is an exact measure of the corresponding change which takes place during the same interval in the amount of the pressure drop across the orifice 40 for any particular output of the pump 10; that is to say, it is an exact measure of the effect of the change in viscosity upon the amount of the pressure drop across the orifice 40 produced by a constant output of the pump 10 and with the adjustment of the orifice 40 and the spring 34 unchanged. By way of illustration and further explanation, with the arrangement as above described, if change in viscosity of the fluid results in a decrease of 5 lbs. per sq. in. in the amount of the pressure drop across the orifice 70, this viscosity change will also decrease the amount of the pressure drop across the orifice 40 by 5 lbs. per sq. in. if the output of the pump 10 remains constant and no change is made in the setting or adjustment of the orifice 40 and of the spring 34.

According to the preferred embodiment as illustrated in Fig. 3, the change taking place in the amount of the pressure drop across the orifice 70 is employed to correspondingly modify the amount of the pressure drop to be maintained across the orifice 40. The compensating cylinder 63 is therefore connected, as by a passage 65, with the discharge conduit 69 at a point on the inlet side of the orifice 70 and the compensating cylinder 64 is similarly connected, as by the passage 66, with said discharge conduit 69 at a point on the outlet side of said orifice 70. The compensating cylinders 63 and 64 are thus supplied with fluid having the same pressures as the pressures existing on the inlet and outlet sides respectively of the orifice 70.

Two additional opposing forces are thus brought to bear upon the valve piston 30 by the compensating pistons. These two opposing forces have a net difference or resultant tending to move the valve piston 30 toward the right, this net difference or resultant corresponding to and varying with the amount of the pressure drop existing across the orifice 70. The net effect, therefore, is that of a force tending to move the valve piston 30 toward the right and which varies conformably with the amount of the pressure drop across the orifice 70, and hence likewise varies conformably with the viscosity of the fluid.

The net difference or resultant of forces thus exerted upon the valve piston 30 by the compensating pistons combines with the force exerted by the spring 34 to determine the amount of the pressure drop to be maintained across the orifice 40 which is, therefore, modified by change in the amount of said net difference or resultant. The amount of the pressure drop to be maintained across the orifice 40 is thus modified conformably with the change in viscosity of the fluid and in exact accordance with the change occurring in the amount of the pressure drop across the orifice 40, with a constant rate of fluid flow therethrough, resulting from viscosity change. In other words, decrease in viscosity of the fluid reduces the amount of the pressure drop across the orifice 40 produced by a constant output of the pump 10 and therefore reduces the net difference or resultant of the forces exerted upon the valve piston 30 by fluid from the inlet and outlet sides of the orifice 40, which net difference or resultant tends to move the valve piston 30 toward the left; this decrease in viscosity simultaneously also reduces, by exactly the same amount, the sum of the combined opposing forces which tend to move the valve piston 30 toward the right. In the same manner, increase in viscosity of the fluid simultaneously and equally increases the forces tending to move the valve piston toward the right and those tending to move it toward the left. The relative balance of forces acting upon the valve piston 30 is therefore undisturbed by change in viscosity of the fluid.

Change in viscosity of the circulated fluid thus merely affects the amount of the pressure drop to be maintained across the orifice 40, and alters the amount thereof in exact accordance with the effect of such change in viscosity upon the amount of the pressure drop actually taking place across the orifice 40 with the output of the pump 10 constant and with the adjustment of the orifice 40 and of the spring 34 unchanged.

The compensating mechanism therefore cooperates with the other parts of the output control of the present invention to hold the delivered volume of the pump substantially constant for any setting or adjustment of the orifice 40 and spring 34, regardless of change in viscosity, speed or operation of the pump 10, leakage or for any other reason whatsoever.

In order to prevent leakage of fluid from the valve bore 26 into the compensating cylinder 63 and 64, which leakage might possibly affect the pressures existing in said compensating cylinders, the members 59 and 60 are provided with counterbores or leakage grooves 71 and 72 respectively, intermediate the ends of the valve bore 26 and the exposed ends of the compensating pistons, and said leakage grooves are appropriately connected with the exhaust passage 29 which leads to the reservoir 12.

The pump 67 may be of very small capacity as it is only necessary for it to circulate sufficient fluid to produce the required pressure drop across the orifice 70. The actual volume circulated by the pump 67 is otherwise unimportant and the adjustable feature of the orifice 70 makes it possible to obtain this required pressure drop with an extremely small output of said pump 67. The other principal requirement is that the pump 67 be driven at a substantially constant speed in order that its output may be substantially constant; this may be readily accomplished as the load is small and is also substantially constant.

The pressure of the delivered fluid of the pump 67 will always be relatively low so that an inexpensive type of pump may be employed and power losses incident to its operation will be small. The use of the pump 67 provides a simple and effective means for obtaining a constant rate of fluid flow through the orifice 70 but it will be understood, however, that any other means for obtaining said constant rate of fluid flow there-through may be substituted for the arrangement as shown.

The compensating mechanism as illustrated in Fig. 3 and as above described has numerous advantages. The most important, of course, is that compensating action is in exact accordance with the effect of the change in viscosity actually taking place, and hence is absolutely accurate. A further advantage is that it permits the use of the same compensating mechanism with almost any type of fluid and range of operating temperatures instead of requiring mechanism designed or precisely adjusted to fit the peculiar viscosity characteristics of each individual fluid in each range of operating temperatures. The importance of this will be understood from again considering the fact that almost every lubricating oil, which is the fluid usually employed, has its own peculiar viscosity characteristics. For example, the oil to which reference has been made heretofore is said to have, as previously stated, a viscosity of approximately 220 S. S. U. at 80° F., a viscosity of 150 S. S. U. at 100° F., and a viscosity of approximately 66 S. S. U. at 160° F., whereas two other oils which may be acceptably used in some instances are said to have viscosities of approximately 400 and 675 S. S. U. respectively at 80° F., viscosities of approximately 260 and 370 S. S. U. respectively at 100° F. while the viscosity of both of them is said to be about 100 S. S. U. at 160° F. These figures indicate the great advantage of viscosity compensating mechanism that is universal in the sense that it may be employed and will function accurately with practically any fluid and in practically any range of temperatures, and in which no precise adjustment is required. A further advantage of making the orifice 70 of the variable type is also seen in this connection, as it permits adjustment to produce sufficient pressure drop there-across to provide full viscosity compensating modification in the amount of the pressure drop to be maintained across the orifice 40 without making the amount of the pressure drop across the orifice 70 unnecessarily large.

Fig. 4 illustrates a hydrostatic fluid pressure system embodying further modifications of the present invention. This figure is included in co-pending applications Serial Numbers 250,864 and 268,253 in which certain parts of the subject matter thereof are claimed. In this instance the variable delivery pump 110 is shown as having a pair of laterally movable delivery-determining elements or adjusting rods 117 such as found, for example, in variable capacity vane pumps of the "double-acting" type, one of which is disclosed in U. S. Patent No. 2,141,170. Pumps of this general character are in reality "double" pumps comprising two "pumping sections," and the capacity of each "pumping section" may be varied independent of variation in the capacity of the other "pumping section" thereof. The pump 110 is therefore the equivalent of two smaller variable delivery pumps, and two separate smaller pumps, similar to the pump 10 of Fig. 1 for example, may be substituted therefor if preferred.

Each adjusting rod 117 of Fig. 4 is independently movable to control a portion of the pump's total output, that is, to control the output of its "pumping section," exactly as would be the case if each of said adjusting rods 117 controlled the output of a separate pump. For example, if the output of the pump 110 at a particular speed is 20 gals. per min., each adjusting rod 117 would be independently movable to independently control the output of 10 gals. per min. if the total output is equally divided between the two "pumping sections" as is usually preferable, although not necessarily the case. The pump 110 delivers its maximum output only when both adjusting rods 117 are in their extreme outward position, with respect to the center of the pump 110, and similarly said pump 110 delivers its minimum output when both of said adjusting rods 117 are in their extreme inward position. It will thus be understood that the positions of the adjusting rods 117 determine the output of the pump 110.

Since the adjusting rods 117 are independently movable, it will also be understood that there is an almost infinite number of combinations of relative positions of said adjusting rods 117 capable of producing each output of the pump 110 intermediate its maximum and minimum outputs. For example, to continue the figures of the foregoing example, a delivery of 10 gals. per min. by the pump 110 would be produced by moving both adjusting rods 117 so as to cause the output of each of the two "pumping sections" to be 5 gals. per min.; or said delivery of 10 gals. per min. could be produced by moving one adjusting rod 117 to its extreme inward position so that the delivery of its "pumping section" is zero and moving the other of said adjusting rods 117 to its extreme outward position so that the delivery of its "pumping section" is 10 gals. per min.; or said delivery of 10 gals. per min. could be produced by making the positions of the two adjusting rods 117 such that said total output of 10 gals. per min. is divided between the two "pumping sections" in any other proportion. The output control of the present invention functions accurately irrespective of the division of the total output between the two "pumping sections," as will be more fully explained.

The adjusting rods 117 are attached, as indicated at 118, to the ends of the piston rods of a pair of adjusting pistons 120 by which their movement and position are controlled. The adjusting pistons 120 are reciprocable in adjusting cylinders 121 and are adapted to be moved outward by springs 138 which bear against the adjacent faces of said adjusting pistons 120 and against the covers 122 which close the adjusting cylinders 121. Movement and position of the adjusting pistons 120 are controlled by admission of pressure fluid to or by the extent of the exhaust of fluid permitted from the outer ends of the adjusting cylinders 121. The outer ends of the adjusting cylinders 121 are accordingly connected with the ends of a branched passage 124 leading to and connecting with the single annular cylinder port 127 in the valve bore 126. It will be understood that the springs 138 move the adjusting pistons 120 and their attached adjusting rods 117 in an outward or delivery-increasing direction as far and as rapidly as permitted by the exhaust of fluid from the outer ends of the adjusting cylinders 121. It will also be understood that admission of pressure fluid to the outer ends of the adjusting cylinders 121 will move the adjusting pistons 120 and adjusting rods 117 in an inward or delivery-decreasing direction, the springs 138 being further compressed upon such inward movement. In order to permit the escape of any fluid leaking past the adjusting pistons 120, the inner ends of the adjusting cylinders 121 are connected with the ends of a branched passage 123 which is suitably connected with the reservoir 12, as by a connection with the discharge conduit 69 at a point on the outlet side of the orifice 70.

The valve mechanism illustrated in Fig. 4 is generally similar to that shown in Fig. 2, although differing therefrom in certain particulars as will be presently explained. It includes a valve piston 150 slidably fitted within the valve bore 126 of the valve housing 125 and having three heads 151, 152 and 153 respectively, separated by the reduced portions 155 and 156. The head 152 covers the cylinder port 127 when the valve piston 150 is in its neutral position in which it is shown in Fig. 4. Movement of the valve piston 150 to the right of its neutral position connects the cylinder port 127 with the portion of the valve bore surrounding the valve piston's reduced portion 155, so that fluid may be exhausted from the outer ends of the adjusting cylinders 121, such exhausted fluid returning to the reservoir 12 through the passage 29. As already explained, the adjusting pistons 120 move outward under the influence of the springs 138 when the outer ends of the adjusting cylinders 121 are connected with the exhaust.

Movement of the valve piston 150 to the left of its neutral position connections the cylinder port 127 with the portion of the valve bore 126 surrounding the valve piston's reduced portion 156; pressure fluid supplied to this portion of the valve bore 126, as through the passage 58, may then pass around the reduced portion 156, through the cylinder port 127 and the branched passage 124 to the outer ends of the adjusting cylinders 121, causing the adjusting pistons 120 to move inward. The valve head 152 is shown as provided with a number of conventional V-notches on its end adjacent the reduced portion 156, these notches providing a relatively gradual connection between the reduced portion 156 and the cylinder port 127 when the valve piston moves to the left of its neutral position, thus reducing any tendency toward abrupt movement of the adjusting pistons 120.

In some instances it has been found desirable to provide a centering mechanism for the valve piston to assure its proper location with respect to the other parts when said valve piston is in its neutral position and for the further purpose of reducing or eliminating any tendency toward "hunting" or "surging" that may be present. A centering mechanism suitable for this purpose and of conventional type is illustrated in Fig. 4, which may likewise be employed with the embodiments heretofore described.

As shown in Fig. 4, the centering mechanism is located in the bore of a housing 80 which is suitably attached to the right hand end of the valve housing 125, as by threaded engagement therewith. The outer end of the housing 80 is in turn closed by an auxiliary valve housing 90, the purpose of which will be later explained, and the two parts are appropriately fastened together, as by the screws 92. It is preferable that there be substantially no pressure of any fluid that may enter the bore of the housing 80, as through leakage, and a passage 93 leading to the reservoir 12 is accordingly connected with said bore.

The centering mechanism also includes a pair of washers or annular members 81 and 82 freely slidable upon a rod 83 which is of smaller diameter than that of the valve piston 150 to which it is securely attached as by the pin 84. A relatively light compression spring 85 is positioned between the two washers 81 and 82 and urges them toward the stops or seats 87 and 88 formed respectively by the end of the valve housing 125 and the reduced end portion of the bore of the housing 80. The arrangement is such that when the valve piston 150 is in its neutral position the washer 81 is in contact both with its seat 87 and with the adjacent end of the valve piston 150; and similarly, the washer 82 is then in contact with its seat 88 and is also in contact with the adjacent end of the auxiliary valve piston 154 which is carried by the rod 83 and is positioned with respect thereto by the nut 86 on the threaded end of said rod 83.

The washers 81 and 82 may thus move toward each other, upon further compression of the spring 85, and one or the other of them is so moved whenever the valve piston 150 moves out of its neutral position. In other words, when the valve piston 150 moves toward the right of its neutral position the end of said valve piston 150 will move the washer 81 toward the right and away from its seat 87; the washer 82 remains against its seat 88, the rod 83 sliding through the hole at the center of said washer 82. Similarly, when the valve piston 150 moves to the left of its neutral position the end of the auxiliary valve piston 154 moves the washer 82 toward the left and away from its seat 88, the washer 81 remaining against its seat 87 as the rod 83 slides through the hole at its center. In this manner the centering mechanism tends to maintain the valve piston 150 in its neutral position and presents a relatively slight increased resistance to displacement of said valve piston in either direction.

The modified valve mechanism of Fig. 4 also includes an auxiliary valve bore formed in the auxiliary valve housing 90 and of the same diameter as the valve bore 126, into which the auxiliary valve piston 154 is slidably fitted. The auxiliary valve bore is thus equivalent to a continuation of the valve bore 126 and the auxiliary valve piston 154 is likewise equivalent to an additional head on the valve piston 150. The valve piston 150, rod 83 and auxiliary valve piston 154 may thus be said to comprise the valve piston assembly.

The left hand end of the valve piston 150 projects beyond the end of the valve housing 125 and into the bore of a housing 95 which is attached to the left hand end of the valve housing 125 by threaded engagement therewith. Also positioned in the bore of the housing 95 is the spring 34 having abutment pieces 35 and 96 respectively on each of its ends. The abutment piece 96 bears against the adjacent end of the valve piston 150 and the abutment piece 35 bears against the end of the screw 36 which extends through the closed end of the housing 95 and provides means for adjusting the compression of the spring 34 as already explained. As will be readily understood, the spring 34 exerts a force upon the valve piston 150 tending to move the valve piston assembly toward the right as viewed in Fig. 4 and the abutment piece 96, which is of larger diameter than that of the valve bore 126, limits the maximum distance in this direction to which said valve piston assembly can be moved by said spring 34.

As in the embodiments previously described, position and movement of the valve piston assembly are determined and effected by the actual pressure drop existing across the metering orifice 40 relative to a predetermined pressure drop thereacross. The orifice 40 is here shown as positioned in the portion 15 of the discharge conduit and the end of the auxiliary valve bore in the auxiliary valve housing 90 is accordingly connected, as by the passage 42, with said portion 15 of said discharge conduit at a point on the inlet side of the orifice 40. It has been found, however, that when the metering orifice 40 is positioned in the discharge conduit at a point intermediate the driven member 14 and the reservoir 12, the pressure of the fluid on the outlet side of the orifice 40 is so small and subject to such minor variations that in practice it may frequently be neglected. In other words, the actual amount of the pressure existing on the inlet side of the orifice 40 may alone be practically employed in many instances as the measure of the pressure drop across said orifice and hence may be alone employed in measuring the rate of fluid flow therethrough. The outlet side of the orifice 40 is therefore not connected with the valve mechanism in the arrangement of Fig. 4. The force exerted upon the valve piston assembly by the action of the pressure fluid from the inlet side of the orifice 40 upon the end of the auxiliary valve piston 154 is thus opposed only by the force of the spring 34 when the valve mechanism is employed without viscosity compensating means. This arrangement has the obvious advantage of simplifying the structure and of reducing the necessary fluid connections.

Fig. 4 also illustrates, however, viscosity compensating mechanism differing from that of Fig. 3 only in the particulars which will now be explained. In this instance fluid from the inlet side of the orifice 70 is admitted to the bore of the housing 95, which also serves as a compensating cylinder, where it acts upon the exposed end of the valve piston 150 (or more accurately, acts upon the end of said valve piston 150 through the abutment piece 96) and thus supplements the force exerted by the spring 34. As in the case of the fluid pressure on the outlet side of the orifice 40 of Fig. 4, it has likewise been found that the pressure on the outlet side of the orifice 70 may be neglected for most practical purposes. The pressure on the inlet side of the orifice 70 is accordingly alone employed as the measure of the pressure drop thereacross and the valve piston assembly is therefore not acted upon by fluid from the outlet side of said orifice 70. Compensation for viscosity change is thus effected by variation in the supplementary force exerted upon the valve piston 150 by pressure fluid in the bore of the housing 95, the pressure of this fluid varying substantially with the pressure drop across the orifice 70 and substantially with the change in viscosity of the circulated fluid. In this manner the amount of the pressure drop to be maintained across the orifice 40 is modified substantially in accordance with the effect of the change in viscosity of the fluid upon the pressure drop across the orifice 40 caused by a constant rate of fluid flow therethrough.

The operation of the arrangement of Fig. 4 will be understood from the explanations previously given, from which it will be seen that the output of the pump 110 will be held substantially constant for any particular setting or adjustment of the size of the orifice 40 and compression of the spring 34, regardless of change in viscosity of the fluid, speed of operation of the pump or any other factor. Relative movement and position of the two adjusting pistons 120 and their attached adjusting rods 117 are not important, as the output of the pump 110 will be held to the proper amount irrespective of the division of this amount between the two "pumping sections." For example, if the controls are adjusted to provide an output of 10 gallons per minute, this output will be maintained regardless of the amount contributed to this total by each "pumping section." It is immaterial, therefore, whether this output of 10 gallons per minute comprises equal outputs of 5 gallons per minute under the control of each adjusting rod 117, or whether it is comprised of an output of 6 gallons per minute under the influence of one adjusting rod and an output of 4 gallons per minute under the influence of the other adjusting rod, or whether it is comprised of any other combination of outputs which total 10 gallons per minute. This is an important feature as it eliminates the necessity for mechanical linkage or other mechanism that would otherwise be required as, for example, in a unitary control of the conventional "follow-up" type adapted to control the joint outputs of a "double acting" pump or two equivalent separate pumps.

Fig. 4 also best illustrates the "relief valve" feature of the present invention which may likewise be provided in the other embodiments previously described by proper proportion of the parts. When the variable orifice 40 is completely closed, any fluid delivered by the pump 110 will immediately build up a relatively high pressure in the portion 15 of the discharge conduit on the inlet side of said orifice 40. The corresponding force exerted upon the auxiliary valve piston 154 will immediately move the valve piston assembly toward the left until the valve head 152 is to the left of the exhaust passage 29. The reduced portion 156 of the valve piston is made of such length that it connects the point of admission of the pressure fluid from the passage 58 with the exhaust passage 29 when the valve piston assembly is displaced to the left to this extent. With the parts in this displaced position, it will be seen that pressure fluid from the portion 13 of the discharge conduit will be exhausted through the passage 58, the valve bore 126 and the exhaust passage 29.

This "safety valve" or "relief valve" feature makes it unnecessary to provide absolute zero output of the pump and hence makes it unnecessary to resort to the precise dimensions or adjustments that are usually required to provide an output of absolutely zero. It also makes it possible to establish the minimum output of the pump at an amount slightly greater than zero so that pressure fluid will always be available for movement of the power adjusting mechanism, as is particularly desirable in instances where it is not practical to employ the spring-loaded arrangement of Fig. 4 or that of Fig. 1. It will be noted that no movement of the driven member 14 occurs during this exhaust of fluid inasmuch as the orifice 40 is completely closed and prevents the exhaust of fluid by the driven member; in fact, the only possible movement of the driven member is the slight amount corresponding to the volume of fluid necessary to move the valve piston assembly to the by-passing or exhaust position, and this is negligible. It will also be noted that the pressure of the fluid required to move the valve piston assembly to the exhaust position is not excessive, as the resistance presented to movement in this direction is, in fact, relatively small. The exhaust of fluid from the portion 13 of the discharge conduit therefore takes place at a lower pressure than would exist if a separate relief valve of conventional type were provided in said portion 13, thus reducing power losses. As already stated, this "relief valve" feature may be provided in the previously described embodiments by proper proportioning of the parts.

While I prefer to employ the previously described hydraulic means to modify the pressure drop across the orifice 40 in order to compensate for change in viscosity of the fluid, such modification of said pressure drop may be effected by other means such, for example, as the mechanical means illustrated in Fig. 5. The valve mechanism of Fig. 5 is similar to that of Fig. 1 except that the valve bore 26 is lengthened to slidingly receive a small piston or plunger 200 which is adapted to bear against the adjacent end of the spring 34 to determine the compression thereof. The plunger rod 201 is guidingly supported in an appropriate bearing plug 202 in the end of the valve bore 26 and the end of said plunger rod 201 projects into a cam chamber 203, here shown as formed integrally with the valve housing 25.

The end of the plunger rod 201 slidingly bears against the face of a cam 206 which is pivotally mounted as at 207 in the cam chamber 203. It will thus be seen that movement of the cam 206 about its pivot will alter the position of the rod 201 and plunger 200, and hence will alter the compression of the spring 34. The arrangement is such that rotation of the cam 206 in a clockwise direction causes increased compression of the spring 34 and its rotation in a counter-clockwise direction causes decrease in said compression.

The cam 206 is adapted to be rotated responsive to change in viscosity of the circulated fluid so that compression of the spring 34 may be correspondingly modified. The cam 206 is accordingly pivotally connected with one end of a short link 209, the other end of which is pivotally connected with the upper end of a rod 211 which is slidingly supported by a pair of bearing plugs 212. The lower end of the rod 211 extends into a smaller chamber 215, the casings of the chambers 203 and 215 being suitably fastened together to prevent escape of fluid at the joint between them. The chamber 215 is connected into the portion 13 of the discharge conduit at a point intermediate the orifice 40 and the driven member 14, that is, on the outlet side of the orifice 40, so that the chamber 215 forms, in effect, an enlarged portion of said discharge conduit.

The lower end of the rod 211 bears against a curved or flexed member 216 which is positioned in the chamber 215 and is exposed to the circulated fluid passing through said chamber. The member 216 is made of a material having a high coefficient of expansion and is here schematically shown as a conventional bi-metallic thermostatic member. The side walls of the chamber 215 confine the ends of the member 216 and prevent their further spreading movement so that the midpoint of said member 216 is forced upward as said member 216 expands.

It is necessary that the parts of the compensating mechanism be hydraulically balanced to prevent their displacement by action of unequal fluid pressures. Fluid passages are accordingly provided in the bearing plugs 202 and 212 so that the chambers 203 and 215 and the end of the valve bore 26 to the left of the plunger 200 will at all times contain fluid under the same pressure as that on the outlet side of the orifice 40.

Change in viscosity of the circulated fluid will, of course, always be accompanied by change in temperature. A decrease in viscosity will, therefore, be accompanied by an increase in temperature of the fluid which will be communicated to the member 216 and cause expansion thereof. An upward force will thus be exerted upon the rod 211 which, through the link 209, will correspondingly rotate the cam 206 in a counter-clockwise direction, thus reducing the compression of the spring 34 and hence likewise reducing the amount of the pressure drop to be maintained across the orifice 40. Similarly, an increase in viscosity of the fluid will be accompanied by a decrease in its temperature which will cause contraction of the member 216, allowing the rod 211 to be moved downward and the cam 206 to be correspondingly rotated in a clockwise direction; this movement of the rod 211 and rotation of the cam 206 takes place under the influence of the spring 34 and of the tension spring 205, one end of which is attached to the cam 206 and the other end of which is attached to the cover 204 of the cam chamber casing.

It will thus be seen that by proper proportion of the parts the compression of the spring 34 may be modified conformably with the change in the viscosity of the circulated fluid, thus altering the pressure drop to be maintained across the orifice 40 so that change in viscosity of the fluid will not affect the output of the pump 10. With this arrangement it is necessary to provide a special cam for use with each particular fluid, as the cam face must necessarily be shaped according to the peculiar viscosity characteristics of the fluid with which it is used. This arrangement has the advantage, however, of providing a self-contained compensating mechanism which does not require an auxiliary fluid circuit and it may be used in connection with a metering orifice positioned either intermediate the pump and driven member, as illustrated in Fig. 5, or intermediate the driven member and the reservoir.

Compensation for change in viscosity of the circulated fluid may also be accomplished without modifying the amount of the pressure drop to be maintained across the metering orifice but by modifying the size or extent of opening of said metering orifice, as, for example, by the arrangement illustrated in Fig. 6. The metering orifice of Fig. 6 may be substituted for the variable orifice 40 of Figs. 1, 1a, and 2. It is shown as of the conventional balanced piston valve type and includes the usual valve piston 220 slidably fitted within the bore 226 of the valve housing 225. The discharge conduit is connected with the valve bore 226 through a pair of spaced annular ports 227 and 228 respectively and, as indicated by the arrows, fluid enters the valve bore through the port 227 and passes out through the port 228.

The valve piston 220 comprises a pair of heads 221 and 222 separated by a reduced portion 223 which is preferably tapered to provide gradual opening and closing of the orifice and thus facilitate adjustment: The size of the metering orifice is varied by axial movement of the valve piston 220 in the valve bore 226, this movement varying the extent to which the head 221 restricts communication between the port 227 and the portion of the valve bore 226 leading to the port 228. The arrangement is such that the valve piston may be moved to any desired extent so that the size or extent of opening of the metering orifice may be infinitely varied from the fully open position to the fully closed position in which the head 221 completely cuts off communication between the port 227 and the valve bore 226. The reduced tapered portion 223 is made of such length that the head 222 does not restrict the cylinder port 228 at any position of adjustment of the valve piston 220.

A spring 230 is positioned in the closed lower end of the valve bore 226 and acts to move the valve piston 220 upwardly as far and as rapidly as permitted by the other parts of the adjusting mechanism. The upper end of the valve piston 220 bears against the adjacent end of a plunger rod 231 which projects through and is slidably supported by the cover 229 which closes the valve bore 226. In order to assure quick and easy movement of the valve piston 220 and to prevent disturbance of its position in the valve bore 226 by the action of unequal fluid pressures on the ends thereof, the portions of the valve bore 226 axially beyond the ends of the valve piston 220 are provided with a fluid connection, such as the passage 232, and the closed lower end of the valve bore 226 is connected with an exhaust passage 233 which may lead to the reservoir 12.

The outer end of the plunger rod 231 slidably bears against an adjusting lever 234 by which the position of said plunger rod 231, and hence the position of the valve piston 220, are determined. One end of the adjusting lever 234 is provided with a suitable handle 235, near which said adjusting lever 234 is pivotally connected as at 236 with a member which may be moved along a curved locking bar 237 and which may be held or fastened at any desired position on said locking bar 237 by the friction gripping mechanism illustrated at 238. The other end of the adjusting lever 234 is adapted to be supported upon a movable fulcrum and is accordingly provided with a slot 239 for slidably receiving a fulcrum block which is rotatable upon a fulcrum pin as indicated by the dotted lines at 240.

The fulcrum pin is carried by a preferably forked fulcrum bar 241 which is slidably supported by any suitable means, not shown, upon a supporting member 242. The fulcrum bar 241 is also attached to the outer end of the piston rod 243 of a compensating piston 244 reciprocable in a compensating cylinder 245, the piston rod 243 being guidingly supported by the cylinder cover 246 through which it projects. A spring 247 is positioned in the closed end of the compensating cylinder 245 and exerts a force tending to move the compensating piston 244 toward the right as viewed in Fig. 6.

The compensating cylinder 245 is connected with an auxiliary or compensating circuit identical with that of Fig. 3 and including a constant capacity pump 67 receiving its supply of fluid through a conduit 68 from the same source of supply as that of the fluid passing through the metering orifice in the valve bore 226. The auxiliary or compensating circuit also includes a variable orifice 70 in the pump's discharge conduit 69, and the forward or piston rod end of the compensating cylinder 245 is connected with said discharge conduit 69 at a point on the inlet side of said orifice 70 while the rear or closed end of said compensating cylinder 245 is connected with said discharge conduit 69 at a point on the outlet side of the orifice 70, these connections being provided by the passages 65 and 66.

With this arrangement pressure fluid from the inlet side of the orifice 70 exerts a force upon the compensating piston 244 which is opposed by the combined forces exerted upon the other side of the piston 244 by the spring 247 and fluid from the outlet side of the orifice 70. When the pump 67 is driven at a constant speed, the pressure drop across the orifice 70 will vary, as hereinbefore explained, conformably with change in viscosity of the circulated fluid, so that the force acting to hold or move the compensating piston against the force exerted by the spring 247 will vary correspondingly. It will thus be seen that the compensating piston 244 and the fulcrum pin will be moved toward the right upon decrease in viscosity of the circulated fluid and toward the left upon increase in said viscosity, the extent of this movement corresponding to the extent of change in viscosity.

Such movement or change in position of the fulcrum pin causes the adjusting lever 234 to rock about its pivot 236, which in turn results in change in position of the valve piston 220 in the valve bore 226, thus modifying the size or extent of opening of the metering orifice. In other words, upon decrease in viscosity of the fluid the compensating piston and fulcrum will move toward the right, as already stated, thus moving the valve piston 220 downward and reducing the extent of opening of the metering orifice; increase in viscosity produces action reverse to that just explained and the extent of opening of the metering orifice is increased. The dotted lines of Fig. 6 show, to somewhat exaggerated extent, the relative positions to which the parts will move from their positions as shown in full lines upon decrease in viscosity of the fluid.

Change in resistance to flow caused by change in viscosity of the fluid is thus offset and balanced by modifying the extent of opening of the variable metering orifice to oppositely change the resistance to flow presented thereby. It will therefore be seen that with proper proportion of the parts, the size or extent of opening of the metering orifice may be modified conformably with the effect produced by change in viscosity of the fluid so that the output of the pump 10 will not be affected thereby when the arrangement of Fig. 6 is substituted for the variable orifice 40 of Figs. 1, 1a and 2. It will also be noted that the modifying action to compensate for viscosity change does not affect the position at which the pivot 236 is fastened upon the locking bar 237, so that there is a definite and unchanged output of the pump for each position of adjustment of this manually movable member.

The arrangement of Fig. 6 is suitable for use as a metering orifice positioned at any point in the discharge conduit, that is to say, this arrangement may be employed when the metering orifice is to be positioned intermediate the pump and the driven member, as in Fig. 1, or intermediate the driven member and the reservoir, as in Fig. 2. The orifice 70 is preferably not adjusted during operation, but as explained in connection with the embodiment of Fig. 3, its variable feature makes possible the use of the same compensating mechanism with almost all fluids. A nondifferential piston may be substituted for the compensating piston 244, although the differential areas of the piston's ends resulting from the piston rod, in the arrangement as shown, will be satisfactory in most instances because the pressure acting on the "big end" thereof is usually negligible, as it is the same as the pressure existing on the outlet side of the orifice 70; and in fact, connection between the closed end of the compensating cylinder and the outlet side of the orifice 70 may be omitted entirely.

Each of the springs 34 of the various embodiments functions, as described above, as a constant force (i. e., a force varying only with change in extent of compression of the spring, which is very small in the present instance, and determined by the "rate" of said spring) opposed to the resultant force due to the difference in pressures on the opposite sides of the orifices 40, and any other suitable means for obtaining this substantially constant but adjustable force may be employed. The spring 34 of Fig. 3 may be made adjustable in the manner of the other embodiments. The double acting pump or equivalent multiple pump units having a common discharge conduit, as is shown in Fig. 4, may be substituted for the single pumps diagrammatically illustrated in the other figures and as indicated above the centering mechanism shown in Fig. 4 may be used in connection with any of the other embodiments. The constrictions 42' and 43' of Fig. 3, and shown also in other figures but not enumerated, may be employed in any of the other pipe connections shown in the drawings.

It will be understood that the several embodiments of my invention have been described for the purpose of illustrating the operation and construction of the apparatus of my present invention and that changes may be made without departing from the spirit of the invention.

I claim:

1. In mechanism for controlling the output of a variable delivery pump having a fluid discharge conduit, a flow resistance means in said conduit, power means for varying the delivery of said pump, and fluid pressure operated control means responsive to the pressure drop across said flow resistance means for controlling said power means, said fluid pressure operated control means being operated upon by two opposed forces, one of said forces being the net force produced by the difference in pressure across said resistance flow means and tending to control the power means in a direction to decrease the pump delivery and the other of said forces being a variable force, and means for varying the magnitude of said variable force to thereby alter the delivery of said pump.

2. In mechanism for controlling the output of a variable delivery pump having a fluid discharge conduit and also having a delivery-determining member movable to alter the delivery thereof, the combination of power-actuated means for moving said delivery-determining member, dual means for regulating at will the output of said pump, said dual means including a variable orifice in said discharge conduit and separate means separately adjustable to establish a predetermined pressure drop to be maintained across said orifice, an element active by the position thereof to control operation of said power-actuated means and correlated with said orifice whereby said position thereof is determined by actual pressure drop across said orifice relative to said predetermined pressure drop, said element occupying a neutral position responsive to an actual pressure drop across said orifice equal to said predetermined pressure drop and rendering said power-actuated means inoperative in said neutral position, said element being displaced from said neutral position responsive to variation in said actual pressure drop relative to said predetermined pressure drop and being active in said displaced position to cause operation of said power-actuated means whereby the output of said pump is correctively modified to produce an actual pressure drop across said orifice substantially equal to said predetermined pressure drop, said element being restored to its neutral position responsive to said corrective modification of said output.

3. Control mechanism for fluid-pressure-actuated delivery-determining means movable to vary the delivery of a variable delivery pump, said pump having a fluid discharge conduit, said control mechanism comprising a variable orifice in said discharge conduit, a valve chamber, a valve element movable in said valve chamber and active by the position thereof to control operation of said fluid-pressure-actuated delivery-determining means by admitting pressure fluid delivered by said pump and under pump pressure to said last named means and by controlling exhaust of fluid therefrom, fluid connections between said discharge conduit and said valve chamber whereby said valve element is acted upon in one direction by a force determined by and varying with the pressure drop across said orifice, a spring for exerting upon said valve element a force acting in a direction opposite to that of said pressure-drop determined force, said valve element being moved responsive to difference between said two forces acting thereon to make said fluid-pressure-actuated delivery-determining means operative whereby the output of said pump is modified to produce a pressure drop across said orifice of such magnitude that the pressure-drop determined force exerted upon said valve element equals the force exerted by said spring, said valve element being moved responsive to said equalization of opposing forces acting thereon to make said fluid-pressure-actuated delivery determining means inoperative.

4. In mechanism for controlling the output of a variable delivery pump having a fluid discharge conduit, a delivery-determining member for said pump movable to vary the fluid volume delivered thereby, power-actuated means for moving said delivery-determining member, control means responsive to the rate of fluid flow through said conduit for regulating the operation of said power actuated means whereby the output of said pump is automatically varied to produce fluid flow at a substantially constant predetermined rate through said conduit, and means for infinitely varying the output of said pump intermediate the minimum and maximum outputs thereof comprising means adjustable to determine and to vary said predetermined rate of fluid flow and separate means adjustable to determine and to vary the fluid volume required to produce said predetermined rate.

5. In a fluid circuit including a variable delivery pump unit for supplying fluid thereto and having a fluid discharge conduit, an output control mechanism therefor comprising, a delivery-determining member movable to alter the delivery of said unit and power-actuated means for moving said delivery-determining member, an orifice in said discharge conduit, said orifice being adjustable to vary the extent of opening thereof, and an element responsive to increase and decrease in difference between the fluid pressures on the inlet and outlet sides respectively of said orifice relative to a predetermined pressure drop there-across, said element controlling the operation of said power-actuated means to effect a substantially constant output of said pump for each extent of opening said orifice and to vary the output of said pump conformably with variation in adjustment of extent of opening thereof, whereby said difference in fluid pressures is maintained at an amount substantially equal to said predetermined pressure drop.

6. In fluid output control mechanism for a plurality of variable delivery pumping units having a common discharge conduit, each of said pumping units having a delivery-determining member independently movable to vary the delivery thereof and also having separate power-actuated means operatively connected therewith for moving said delivery-determining means, the combination of an orifice in said common discharge conduit, said orifice being adjustable to vary the extent of opening thereof, and an element responsive to increase and decrease in difference between the fluid pressures on the inlet and outlet sides respectively of said orifice relative to a predetermined pressure drop there-across, said element controlling the operation of all of said power-actuated means to effect a substantially constant combined output of said pumping units for each extent of opening of said orifice and also controlling the operation of all of said power-actuated means to vary the amount of said combined output of said pumping units conformably with variation in adjustment of extent of opening of said orifice, whereby said difference in fluid pressures is maintained at an amount substantially equal to said predetermined pressure drop.

7. In output control mechanism for a variable delivery pump having a discharge conduit and adapted to circulate a fluid of changeable viscosity, a flow resistance means in said circuit, power means for varying the delivery of said pump, and fluid pressure operated control means responsive to the pressure drop across said flow resistance means for controlling said power means, said fluid pressure operated control means including a valve piston operative upon a predetermined drop of pressure across said flow resistance means to hold said power means in a fixed position but being operative upon departures therefrom to control the power means for varying the pump delivery in a direction to correct for such departures in pressure drop, and viscosity compensating means co-operating with said fluid pressure operated control means for correcting for the exact departures in fluid pressure drop actually taking place across said flow resistance means due to changes in viscosity of the fluid, including means continuously sensitive to determine the exact extent of said departures.

8. In a fluid pressure system having a variable delivery pump and a fluid circuit supplied thereby, in combination, a flow resistance means in said circuit, means responsive to the pressure drop across said flow resistance means for controlling the delivery of said pump, and co-operating viscosity compensating means for correcting for departures in pressure drop across said flow resistance means due to changes in viscosity irrespective of the viscosity characteristics of the circulated fluid, including a single valve piston means directly influenced both by the pressure drop across said flow resistance means and by said co-operating viscosity compensating means.

9. In a hydrostatic fluid pressure system having a variable delivery pump in the fluid circuit thereof, in combination, a flow resistance means in said circuit, means responsive to the pressure drop across said flow resistance means for controlling the delivery of said pump, and co-operating viscosity compensating means for correcting for departures in pressure drop across said flow resistance means due to changes in viscosity, including an auxiliary circuit having means for causing fluid to flow therethrough at a constant rate and in which there is a flow resistance means, together with means for utilizing the pressure drop across said last flow resistance means in direct opposition to the pressure drop across said first named resistance means to correct for said departures in pressure drop across the first named flow resistance means by modifying the amount of the pressure drop to be maintained thereacross.

10. In a fluid pressure system having a variable delivery pump in the fluid circuit thereof, in combination, a flow resistance means in said circuit, said flow resistance means including a variable orifice, means responsive to the pressure drop across said flow resistance means for controlling the delivery of said pump, and cooperating viscosity compensating means for correcting for departures in pressure drop across said flow resistance means due to changes in viscosity, including means for varying the extent of opening of said variable orifice in response to changes in viscosity.

11. In fluid output control mechanism for a variable delivery pump having a fluid discharge conduit and adapted to circulate therethrough a liquid of changeable viscosity, said pump also having a delivery determining member movable to alter the delivery thereof and power actuated means for moving said delivery determining member, the combination of a variable orifice in said conduit, control mechanism regulating the operation of said power actuated means and coordinated with said variable orifice in pressure drop reactive relation thereto, said control mechanism including an element movable responsive to variation in actual pressure drop across said orifice relative to a predetermined pressure drop there-across and active upon said responsive movement to cause operation of said power actuated means to effect corrective modification in the delivery of said pump whereby the actual pressure drop across said orifice is maintained substantially equal to said predetermined pressure drop there-across, and means sensitive to change in viscosity of said liquid for varying the amount of said predetermined pressure drop conformably with variation in amount of actual pressure drop across said orifice simultaneously resulting from change in viscosity of said liquid, whereby the output of said pump is unaffected by said viscosity change.

12. In fluid output control mechanism for a variable delivery pump having a fluid discharge conduit and adapted to circulate therethrough a fluid of changeable viscosity, said pump also having a delivery determining element movable to alter the delivery thereof and power actuated means for moving said delivery determining member, the combination of a variable orifice in said conduit, control mechanism for said power actuated means coordinated with said variable orifice in pressure drop reactive relation thereto, said control mechanism including an element movable responsive to variation in actual pressure drop across said orifice relative to a predetermined pressure drop there-across and active upon said responsive movement to cause operation of said power actuated means to effect corrective modification in the delivery of said pump whereby the actual pressure drop across said orifice is maintained substantially equal to said predetermined pressure drop there-across, and means for compensating for the effect of change in viscosity of the circulated fluid upon the actual pressure drop across said orifice whereby the output of said pump is unaffected thereby irrespective of the viscosity characteristics of said fluid.

13. In a fluid pressure system having a variable delivery pump in the fluid circuit thereof, in combination, a flow resistance means in said circuit, valve piston means responsive to the pressure drop across said flow resistance means for controlling the delivery of said pump, and co-operating viscosity compensating means for correcting for departures in pressure drop across said flow resistance means due to changes in viscosity, including an auxiliary circuit having means for causing fluid to flow therethrough at a constant rate and in which there is a flow resistance means, with pipe connections leading from both sides of said last named flow resistance means to said valve piston means.

14. In a fluid pressure system having a variable delivery pump in the fluid circuit thereof, in combination, a flow resistance means in said circuit, a device for varying said flow resistance means, means responsive to the pressure drop across said flow resistance means for controlling the delivery of said pump, and co-operating viscosity compensating means for correcting for departures in pressure drop across said flow resistance means due to changes in viscosity, including means whereby said co-operating viscosity compensating means reacts upon said device which varies said flow resistance means for correcting for said departures.

15. In a fluid pressure system having a variable delivery pump in the fluid circuit thereof, in combination, a flow resistance means in said circuit, means responsive to the pressure drop across said flow resistance means for controlling the delivery of said pump, and co-operating viscosity compensating means for correcting for departures in pressure drop across said flow resistance means due to changes in viscosity, including a variable cam operatively associated with the means which is responsive to the pressure drop and active to correct for said departures.

16. In mechanism for controlling the output of a variable delivery pump, said pump having a fluid discharge conduit and also having a delivery-determining element movable to alter the delivery thereof, the combination of power-actuated means for moving said delivery-determining element, an orifice in said discharge conduit, said orifice having its outlet side continuously under substantially atmospheric pressure, and valve mechanism for controlling the operation of said power actuated means, said valve mechanism including a valve piston movable in one direction to cause delivery-increasing movement of said power actuated means and said delivery-determining element and movable in the opposite direction to cause delivery decreasing movement thereof, said valve piston being acted upon by a spring urging it in its delivery increasing direction and being oppositely acted upon by pressure fluid from the inlet side of said orifice, urging said valve piston in its delivery-decreasing direction of movement.

17. In a fluid pressure system having a variable delivery pump in the fluid circuit thereof, in combination, a flow resistance means in said circuit, means responsive to the pressure drop across said flow-resistance means for controlling the delivery of said pump, and cooperating viscosity compensating means for correcting for departures in pressure drop across said flow resistance means due to change in viscosity, including an auxiliary circuit having a pump for circulating fluid therethrough at a constant rate and in which there is an orifice the outlet side of which is continuously under substantially constant pressure, with a fluid connection leading from only the inlet side of said orifice to said means which is responsive to the pressure drop across said flow resistance means.

18. Control mechanism for fluid-pressure actuated delivery-determining means movable to vary the delivery of a variable delivery pump, said pump having a fluid discharge conduit, said control mechanism including a variable orifice in said discharge conduit, a valve chamber, and a valve element movable in said valve chamber and active by the position thereof to control operation of said fluid-pressure-actuated delivery-determining means, means for compensating for change in pressure drop across said first named orifice due to change in viscosity of the circulated fluid including a second orifice and also including means for causing fluid to flow therethrough at a constant rate, fluid connections between said discharge conduit and said valve chamber whereby said valve element is urged in one direction by difference in pressures across said first named orifice and fluid connections between said viscosity compensating means and said valve chamber whereby said valve element is urged in the opposing direction by difference in pressures across said second named orifice.

CHARLES M. KENDRICK.